Nov. 6, 1923.

J. S. COLDWELL 1,473,015

MOTOR DRIVING MECHANISM

Filed May 10, 1919

INVENTOR.
John S. Coldwell
BY
Frank W. Hubbard
ATTORNEY

Patented Nov. 6, 1923.

1,473,015

UNITED STATES PATENT OFFICE.

JOHN S. COLDWELL, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR DRIVING MECHANISM.

Application filed May 10, 1919. Serial No. 296,273.

*To all whom it may concern:*

Be it known that I, JOHN S. COLDWELL, a citizen of the United States, residing at Milwaukee, in the county of Milwaukee and State of Wisconsin, have invented new and useful Improvements in Motor Driving Mechanisms, of which the following is a full, clear, concise, and exact description, reference being had to the accompanying drawing, forming a part of this specification.

This invention relates to improvements in motor driving mechanisms and is particularly applicable to motor controlled brakes for elevators, although it has various other advantageous applications.

Such brakes are usually spring-set and motor-released and in practice it is usually desired to provide for release of the brake by operation of its controlling motor in either direction whereby such motor may be conveniently controlled conjointly with the elevator motor. Also, in practice, it is desired to employ for the brake, a motor having adequate power to quickly release and hold the brake against the action of the setting spring or springs and if such a motor be employed it tends to overtravel and unduly prolong the brake releasing movement. Furthermore, where the brake is subjected to releasing operations upon reverse operations of the motor and the motor is driven backward by the brake in setting, as is usually desired, the motor must be stopped or released from the brake when set, to prevent unintentional re-release of the latter due to the momentum acquired by the motor when so driven. On the other hand, assuming the use of a driving connection between the motor and brake, which does not provide for release of the brake upon reverse operations of the motor, the motor must be stopped or released as stated to prevent jamming of the brake.

The present invention has among its objects to provide a simple and efficient motor drive for such brakes whereby the same may be controlled as desired and free from danger of overtravel or jamming of parts.

Another object is that of providing a drive including a motor having means adapted upon de-energization of the motor to effect rotative movement of a normally static element thereof, and utilizing such movement to effect automatic disconnection of the motor from its load.

Another object is that of providing a motor drive adapted to effect automatic connection of the motor to its load only during energization of the former and wherein provision is also made for automatically varying the mechanical advantage of the motor with respect to the load during operation of the motor and maintenance of such connection.

Another object is to provide a drive including a clutch so associated with the motor as to be held in engagement by the latter during energization thereof and by a force at all times substantially proportional to the power developed thereby.

Another object is to provide a drive including a motor adapted to effect movement in opposite directions of certain co-operating elements thereof and utilizing such movement of one of said elements to effect a power connection for the other.

Other objects and advantages will hereinafter appear.

The accompanying drawing illustrates one embodiment of the invention and the same will now be described, it being understood that the embodiment illustrated is susceptible of modifications falling within the scope of the appended claims.

In the drawing,

Figure 1 is a side elevational view of the apparatus; while,

Figure 1:
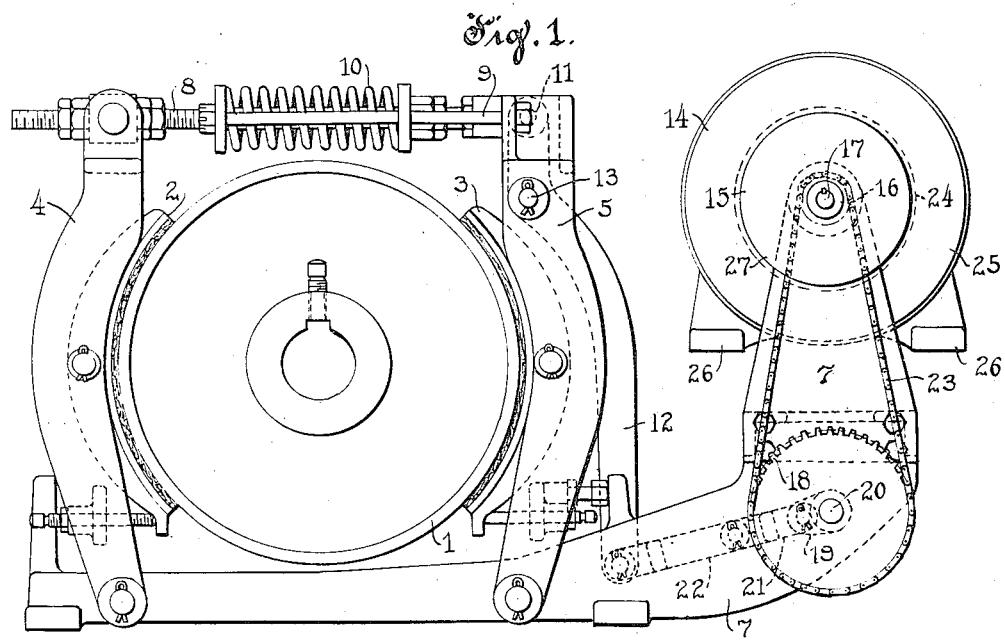
Figure 2:
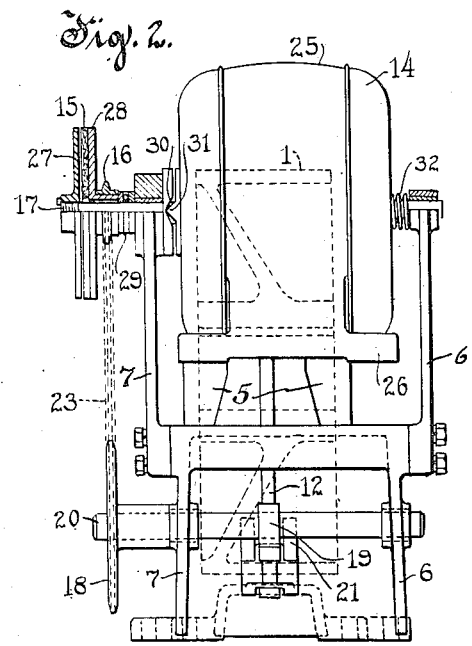
Fig. 2 is an end view of Fig. 1.

Referring to the drawing, the mechanism to be driven comprises a spring set brake of known construction. This brake comprises a drum 1 and brake shoes 2 and 3 respectively carried by arms 4 and 5 fulcrumed between a pair of similar frame members 6 and 7, the latter being rigidly secured in parallel relation and respectively provided with integral or rigidly secured upright portions for supporting the motor driving mechanism hereinafter described. The arms 4 and 5 are provided at their respective upper ends with inwardly projecting and overlapping rods 8 and 9 carrying opposed spring supports between which is mounted a spring 10 tending at all times to draw the upper ends of said arms together to effect setting of the brake. The rod 8 moreover is extended to a point adjacent the upper end of arm 5 and pivotally connected at 11 with the upper end of a brake release lever 12, the latter being fulcrumed to said brake arm 5 as indicated at 13 and extending downwardly for connection with the motor driving mechanism.

The motor driving mechanism comprises a motor 14, a releasable clutch 15 and a sprocket 16 carried by the motor shaft 17, a second sprocket 18 and a crank 19 rigidly mounted upon a counter shaft 20, links 21 and 22 for connecting the crank 19 with the brake release lever 12, said sprockets being connected by a chain 23 and said motor shaft and counter shaft being carried within suitable bearings of the frame members 6 and 7.

The motor 14, having the usual bearings between its relatively moving parts, is supported bodily upon its shaft 17 between the upright portions of the frame members 6 and 7, said shaft being mounted for rotation and limited reciprocation with respect to said frame members and being, moreover, extended through the member 7 and carrying therebeyond the clutch 15 and sprocket 16. The motor comprises a rotative element 24 and a static element 25, said rotative element being rigidly secured to the shaft 17 for driving the same and said static element 25 surrounding said shaft and said rotative element 24 and being moreover axially movable jointly therewith. Said static element 25 is furthermore capable of limited rotative movement in either direction relative to the frame members 6 and 7 and is biased to a predetermined angular position by eccentrically located weights 26 or other suitable means.

The clutch comprises a driving element 27 rigidly secured to the shaft 17 and a driven element 28 loosely mounted upon said shaft between said driving element and the frame member 7, while a thrust bearing 29 is interposed between said clutch element 28 and said frame member 7 for limiting movement of the former toward the latter. Said frame member 7 is furthermore provided on its side adjacent the motor with an interiorly V-faced cam 30 adapted to be engaged by a correspondingly shaped cam element 31 carried by the static element 25 of the motor, whereby obviously upon angular movement of said motor element in either direction from its biased position the co-operation of said cams serves to force the motor, shaft and clutch element 27 axially to the right for causing engagement of the clutch, whereas upon return movement of said motor element to such biased position the aforesaid members are free to shift axially to the left for release of the clutch. A compression spring 32 is interposed between the motor and the frame member 6 for expediting such release and for insuring proper engagement of the cams under all conditions while assisting the action of the weights 26 in returning the static element 25 of the motor to its biased position.

The clutch 15 and also the spring 32 are so designed and proportioned as to limit axial movement of the stator 25 to ranges wherein the element 31 is prevented from moving beyond the divergent faces of the U-faced cam 30, whereby coaction of said elements 30 and 31 serves to limit angular movement of said stator 25.

The sprocket 16 is rigidly secured to the driven element 28 of the clutch 15 whereby during engagement of the clutch the power developed by the motor is transmitted by means of the chain 23 to the sprocket 18 for rotating the shaft 20 and the crank 19.

The combined length of the links 21 and 22 and the crank 19 is such as to insure positioning thereof in the rectilinear relation illustrated when the brake is set, whereas obviously upon angular displacement of the crank in either direction from such position, a pull is transmitted to the lever 12 tending to release the brake. Said crank, moreover, is of relatively short radius as compared with the diameter of the shaft 20 whereby the link 21, which is of materially greater length, is adapted to abut said shaft 20 following approximately 90° rotation of said crank in either direction.

The elements of the device being in the relations illustrated, upon energization of the motor, the opposing moments established therein effect rotative movement of the elements 24 and 25 thereof in opposite directions. Such movement of the rotative element 24 serves to drive the shaft 17 whereas back rotation of the static element 25 under the counter moment of the motor serves as aforedescribed to effect engagement of the clutch 15 by a force at all times substantially proportional to such counter moment. Moreover such force of engagement of the clutch, assisted by the action of the spring 32 and the weights 26, serves to limit such back rotation to a relatively small angle, said static element thereafter remaining fixed during energization of the motor and the power of the latter being thereafter directed solely to driving of the shaft 17 which is now connected to the link mechanism through the aforesaid engagement of the clutch 15.

With the crank 19 in the position illustrated, the mechanical advantage of the motor is obviously at a maximum thus insuring a quick release of the brake against the action of the spring 10, however, as said arm is moved in one or the other direction such advantage decreases rapidly owing to lengthening of the effective radius of said crank against which the motor must act, thus effecting deceleration of the motor following release of the brake. Moreover, following a predetermined movement of said crank, the link 21 is adapted to abut the shaft 20 as aforestated thereby very materially decreasing such advantage of the motor for further deceleration and final stalling thereof. In such condition, however, the motor continues to develop a torque for maintaining the brake disengaged.

Upon de-energization of the motor the clutch 15 is at once disengaged in the manner aforedescribed thereby relieving the brake setting mechanism of the inertia of the rotative element 24 of the motor and permitting a quick application of the brake under influence of the spring 10, while eliminating all tendency toward over-setting of the brake due to counter-momentum of said rotative element, such as would occur were the same not disconnected from the brake mechanism. Furthermore, by suitable adjustment of the spring 32 or the weights 26 or both, the same may be adapted to effect release of the clutch 15 upon any predetermined reduction in the power supplied to the motor, thus insuring setting of the brake and preventing further operation of the mechanism when for any reason the supply of power thereto is inadequate.

What I claim as new and desire to secure by Letters Patent is:

1. The combination with a power device having independently movable elements, said device being adapted to develop substantially continuous opposing forces between such elements, of a releasable clutch to connect one of said elements to a driven device and means controlled by movement of the other of said elements in either direction for effecting engagement of said clutch.

2. The combination with a motor adapted to develop a substantially continuous torque between a pair of independently rotatable elements thereof, of a releasable clutch for connecting one of said elements to a driven device and means to be actuated upon rotation of the other of said elements in either direction from a given position for effecting engagement of said clutch.

3. The combination with a motor adapted to develop a substantially continuous torque between a pair of independently rotatable elements thereof, of a releasable clutch for connecting one of said elements to a driven device and means to be actuated upon rotation of the other of said elements in either direction from a given position for effecting engagement of said clutch and maintaining such engagement by a force at all times substantially proportional to the power developed by said motor.

4. The combination with a motor adapted to develop a substantially continuous torque between a pair of independently rotatable elements thereof, of a releasable clutch for connecting one of said elements to a driven device and means to be actuated upon rotation of the other of said elements upon rotation thereof in either direction from a given position for effecting automatic engagement of said clutch during operation of said device, said clutch being adapted for automatic release upon termination of the power supply to said motor.

5. The combination with a prime mover adapted to develop a substantially continuous torque between independently rotatable elements thereof, of a releasable clutch adapted to connect one of said elements with a device to be driven thereby, means tending to cause release of said clutch and means to be actuated by another of said elements upon rotation thereof in either direction from a given position for opposing the action of said former means and applying to said clutch a preponderant engaging force proportional to the power developed by said prime mover.

6. In a motor drive, in combination, a fixed support, a rotatable and axially shiftable shaft carried thereby, a motor element and a clutch element rigidly secured to said shaft, a second motor element and a second clutch element carried by said shaft for rotation relative to said support, means limiting axial movement of said latter mentioned clutch element in one direction, means biasing said former clutch element in the opposite direction and means operable by said motor to shift said shaft axially for causing engagement of said clutch elements.

7. In combination, a motor having independently rotatable elements, a releasable clutch having a part rigidly connected with one of said motor elements and biased to disengaged position and means to be actuated upon axial movement of another of said motor elements for causing engagement of said clutch.

8. In combination, a motor, having independently rotatable elements, a releasable clutch having a part rigidly connected with one of said elements and biased to disengaged position and means to be actuated upon movement of another of said motor elements in either direction from a given position during operation of the motor for applying to said clutch a preponderant engaging force at all times substantially proportional to the power developed by the motor.

9. In combination, a motor adapted to develop a substantially continuous torque between independently rotatable elements thereof, a releasable clutch associated with said motor for connecting an element thereof with a driven device, said clutch having parts biased to disengaged position, and means to be actuated upon movement of another of said motor elements in either direction for effecting engagement of said clutch.

10. The combination with a reversely operable prime mover having independently movable static and dynamic elements and adapted to develop a substantially continuous torque therebetween, of a releasable clutch adapted to connect said dynamic element with a driven device, said clutch being biased to disengaged position and means to be actuated by the counter-moment of said static element in either direction for effecting engagement of said clutch.

11. The combination with a reversely operable prime mover having independently movable static and dynamic elements and adapted to develop a substantially continuous torque therebetween, of a releasable clutch adapted to connect said dynamic element with a driven device, said clutch being biased to disengaged position and means to be actuated by the counter-moment of said static element in either direction for applying to said clutch during operation of the prime mover a preponderant engaging force at all times substantially proportional to the power developed by said prime mover.

12. In combination, a fixed support, a rotatable and axially shiftable shaft carried thereby, a motor having its dynamic element rigidly secured to said shaft and its static element carried thereby for independent angular movement, a transmission clutch carried by said shaft and having one element rigidly secured thereto, another element of said clutch being rotatable and axially shiftable relatively thereto, means limiting axial movement of said latter mentioned clutch element in one direction relative to said support; means biasing said motor, shaft and rigidly secured clutch element axially in one direction relative to said support and means to be actuated upon movement of the static element of the motor under its counter-moment for shifting said motor together with its shaft and the rigidly secured clutch element axially against said biasing means for effecting engagement of said clutch elements.

13. In a motor driving mechanism, the combination with a motor and a device to be operated thereby, of a power connection therebetween including means for automatically varying the mechanical advantage of said motor with respect to said device and means operable automatically upon de-energization of said motor for interrupting said connection.

14. In a motor driving mechanism, the combination with a motor, of means for connecting the same with a device to be driven thereby, said means including a releasable clutch subject to control by said motor for engagement and disengagement and means for automatically varying the mechanical advantage of said motor with respect to said driven device.

15. In a motor driving mechanism, the combination with a motor adapted to operate a driven device, of means in the connection between said motor and said device for varying the speed of the motor through variation of the mechanical advantage thereof with respect to said device.

16. In a motor driving mechanism, the combination with a motor having a connection with a driven device for operating the latter, of means in said connection for automatically varying the speed of said motor through variation of the mechanical advantage thereof with respect to said driven device.

17. In a motor driving mechanism, the combination with a motor to be connected with a driven device for operating the latter, of means included in the connection between said motor and said device for effecting automatic deceleration and final stalling of the former through varying the mechanical advantage of the former with respect to the latter.

18. In a motor driving mechanism, the combination with a motor to be connected with a driven device for operating the latter, of means subject to control by operation of said motor for automatically establishing and interrupting driving connections between said motor and said device and means for automatically varying the mechanical advantage of the former with respect to the latter.

19. In a motor driving mechanism, the combination with a motor, of a releasable clutch for connecting the same with a driven device, said clutch being subject to disengagement upon de-energization of said motor and re-engagement upon energization thereof and means for automatically varying the speed of said motor through variation of the mechanical advantage thereof with respect to said driven device.

20. In a motor driving mechanism, the combination with a motor, of a releasable clutch for connecting the same with a driven device, said motor being adapted to effect release of said clutch upon a predetermined reduction in the power supplied to the former and means to automatically effect deceleration and final stalling of the motor through variation of the mechanical advantage thereof with respect to said driven device.

21. In combination, a motor having independently rotatable elements, a releasable clutch having a part rigidly connected with one of said elements and biased to disengaged position, means to be actuated upon movement of another of said motor elements for effecting engagement of said clutch, and means associated with said last mentioned means to effect deceleration and stalling of the motor through variation of the mechanical advantage thereof with respect to said driven device.

22. The combination with a spring actuated brake, of a motor having a connection therewith for effecting release thereof, said connection including a clutch subject to disengagement upon de-energization of said motor and engagement during energization of said motor and means for automatically varying the speed of said motor through variation of the mechanical advantage afforded by said connection.

23. The combination with a spring actuated brake having a release lever, of a motor having an operative connection with said lever, said connection including a releasable clutch, a crank shaft and crank to be driven through said clutch and a link connecting said crank with said release lever, said link being adapted to abut said crank shaft upon predetermined rotation of the latter for effecting deceleration of said motor.

24. The combination with a spring actuated brake, of a motor having independently movable dynamic and static elements, and a releasable clutch providing a connection between said motor and said brake for effecting release of the latter, said clutch and said motor being so associated as to insure engagement of the former during energization of the latter and disengagement of the former upon de-energization of the latter.

25. The combination with a spring actuated brake, having an element operable for effecting release thereof, of operating means for said element including a reversible motor having a connection therewith, said connection including means biased to an intermediate position and movable in either direction therefrom for actuation of said releasing element upon operation of said motor in either direction respectively and means for effecting automatic release of said connection upon de-energization of said motor and restoration of the former upon energization of the latter.

26. The combination with a spring actuated brake having an element operable for effecting release thereof, of operating means for said element including a link operatively connected therewith, a crank connected to said link and adapted to occupy a position in alignment therewith while the brake is set, and a reversible motor having a mechanical connection with said crank for moving the same in either direction out of such position for movement of said link to effect operation of said element.

27. The combination with a spring actuated brake having a release lever, of operating means for said lever including a link connected therewith, a crank connected to said link, said link and crank being biased to an intermediate position in extended rectilinear relation with one another, a rotatable operating shaft for said crank adapted to be abutted by said link upon predetermined rotation of said shaft in either direction, and a reversible motor for operating said shaft.

28. The combination with a spring actuated brake having a release lever, of operating means for said lever including a link connected therewith, a crank connected to said link, said link and crank being biased to an intermediate position in extended rectilinear relation with one another, a rotatable operating shaft for said crank adapted to be abutted by said link upon predetermined rotation of said shaft in either direction, a reversible motor for operating said shaft and means for automatically establishing a driving connection between said motor and said shaft during energization of the former and releasing such connection upon de-energization of said motor.

In witness whereof, I have hereunto subscribed my name.

JOHN S. COLDWELL.